(12) United States Patent
Liu et al.

(10) Patent No.: US 10,475,199 B2
(45) Date of Patent: Nov. 12, 2019

(54) OPTICAL MEASUREMENT DEVICE AND THE METHOD USING THEREOF

(71) Applicant: ASUSTeK COMPUTER INC., Taipei (TW)

(72) Inventors: Kuan-Hsien Liu, Taipei (TW); Ding-Chia Kao, Taipei (TW); Hao-Ting Hung, Taipei (TW); Yi-Ou Wang, Taipei (TW); You-Hung Tsai, Taipei (TW); Po Hung Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 443 days.

(21) Appl. No.: 15/242,609

(22) Filed: Aug. 22, 2016

(65) Prior Publication Data

US 2017/0061648 A1    Mar. 2, 2017

(30) Foreign Application Priority Data

Aug. 28, 2015  (CN) .......................... 2015 1 0537461

(51) Int. Cl.
*G06T 7/60* (2017.01)
*G06T 7/00* (2017.01)
(Continued)

(52) U.S. Cl.
CPC .............. *G06T 7/60* (2013.01); *G06T 7/0002* (2013.01); *H04N 5/2258* (2013.01);
(Continued)

(58) Field of Classification Search
CPC .................... G06T 7/60; G06T 7/0002; G06T 2207/10004; H04N 5/2258; H04N 5/23229; H04N 5/232
(Continued)

(56) References Cited

U.S. PATENT DOCUMENTS

| 2009/0185241 A1* | 7/2009 | Nepomniachtchi ...... G06K 9/36 358/474 |
| 2013/0088587 A1 | 4/2013 | Li et al. |
| 2014/0002635 A1* | 1/2014 | Huang .................. G01B 11/14 348/135 |

FOREIGN PATENT DOCUMENTS

| CN | 101074877 | 11/2007 |
| CN | 103512904 | 1/2014 |

(Continued)

OTHER PUBLICATIONS

Office Action of China Counterpart Application, dated Apr. 25, 2019, pp. 1-8.

(Continued)

*Primary Examiner* — Matthew K Kwan
(74) *Attorney, Agent, or Firm* — JCIPRNET (57) ABSTRACT

An optical measurement device and an optical measurement method for measuring a gap on an electronic device are provided. The optical measurement device includes an image capture device and an image processing device. The image capture device is used to capture an image including a gap. The electronic device includes a body and a component assembled on the body. The gap of the electronic device is existed between the body and the component. The image processing device is coupled to the image capture device. The image processing device is used to receive the image, and the image scanning operation is executed to the image to measure the breadth of the gap. The precise measurement result is quickly obtained.

14 Claims, 6 Drawing Sheets

(51) Int. Cl.
H04N 5/225 (2006.01)
H04N 5/232 (2006.01)

(52) U.S. Cl.
CPC ............... *H04N 5/23229* (2013.01); *G06T 2207/10004* (2013.01); *H04N 5/232* (2013.01)

(58) Field of Classification Search
USPC ........................................ 348/135
See application file for complete search history.

(56) References Cited

FOREIGN PATENT DOCUMENTS

| | | |
|---|---|---|
| CN | 102779279 | 9/2014 |
| CN | 104112269 | 10/2014 |

OTHER PUBLICATIONS

Yang Fan et al, "Digital image processing and analysis", Beijing University of Aeronautics and Astronautics Press, Oct. 2007, pp. 1-3.

Shen Tingzhi et al, "Digital image processing and pattern recognition", Beijing Institute of Technology Press, Jul. 2007, pp. 1-4.

Chen Wen et al, "A Vision-based Real-time Detection Method of Texture in Automatic Composite Fiber Placement", Science Technology and Engineering, vol. 11 Issue 18, Jun. 2011, pp. 1-9.

* cited by examiner

OPTICAL MEASUREMENT DEVICE AND THE METHOD USING THEREOF

CROSS-REFERENCE TO RELATED APPLICATION

This application claims the priority benefit of CN application serial No. 201510537461.7, filed on Aug. 28, 2015. The entirety of the above-mentioned patent application is hereby incorporated by reference herein and made a part of specification.

BACKGROUND OF THE INVENTION

Field of the Invention

The invention relates to a measurement device and a measurement method and, more particularly, to an optical measurement device and an optical measurement method.

Description of the Related Art

Conventionally, a breadth of a gap between a body and a component of an electronic device is measured through a contact measurement way by using a thickness gauge and a cursor caliper. However, the surface of the electronic device may be scratched in the contact measurement way, and the errors also may occur in the measurement and record. In addition, the contact measurement way is time-consuming and requires effort.

BRIEF SUMMARY OF THE INVENTION

According to a first aspect of the present disclosure, an optical measurement device, measuring a gap on an electronic device, wherein the electronic device includes a body and a component assembled on the body, the gap is existed between the body and the component, the optical measurement device comprises: an image capture device, capturing an image including the gap; and an image processing device, coupled to the image capture device, wherein the image processing device receives the image and executes an image scanning operation on the image to measure a breadth of the gap.

According to a second aspect of the present disclosure, an optical measurement method for measuring a gap on an electronic device, wherein the electronic device includes a body and a component assembled on the body, the gap is existed between the body and the component, and the optical measurement method includes: capturing an image including the gap on the electronic device; and receiving the image and executing an image scanning operation on the image to measure a breadth of the gap.

In sum, the optical measurement device utilizes the image capture device and the image processing device to measure the breadth of the gap of the electronic device, and then the precise measurement result is quickly provided.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

The terms "coupled" can represent that two or more components are connected directly or indirectly. For example, "the first device is coupled to the second device" represents that the first device is directly connected to the second device, or the first device is indirectly connected to the second device via other device or other connection method. In addition, the terms "the first direction" and "the second direction" in the following embodiments and accompanying drawings may represent a horizontal direction and a vertical direction, respectively, and the invention is not limited thereto.

Figure 1:
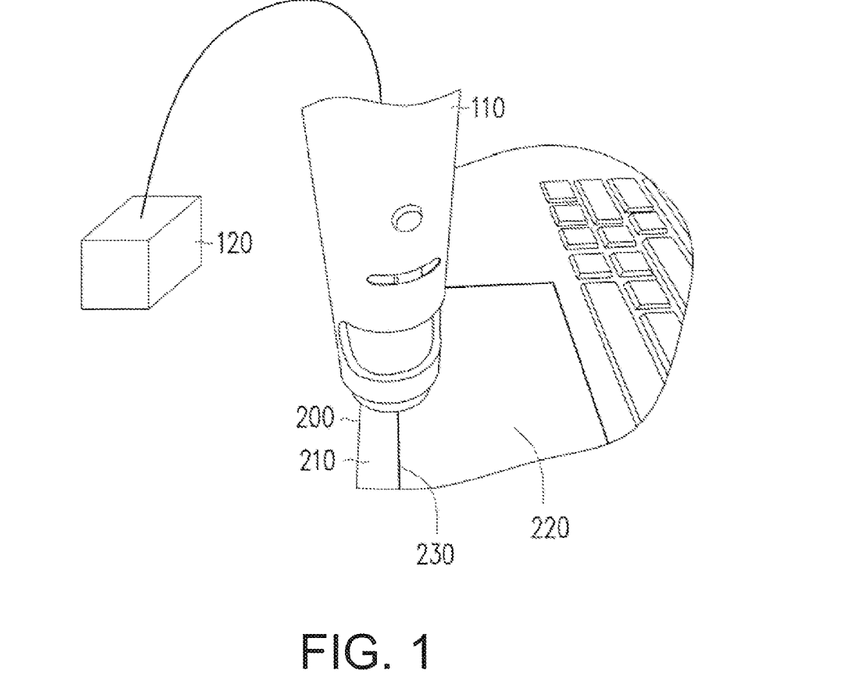
FIG. 1 is a schematic diagram showing an optical measurement device used to measure an electronic device in an embodiment.
Figure 2:
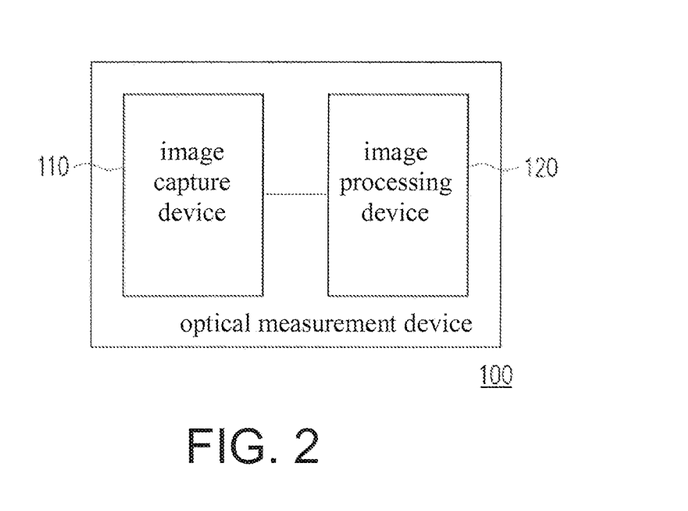
FIG. 2 is a block diagram showing the optical measurement device in FIG. 1.

FIG. 1 is a schematic diagram showing an optical measurement device used to measure an electronic device in an embodiment. FIG. 2 is a block diagram showing the optical measurement device in FIG. 1. Please refer to FIG. 1 and FIG. 2, in the embodiment, an optical measurement device 100 is utilized to measure at least a gap 230 between a body 210 and a component 220 of an electronic device 200. In the embodiment, the electronic device 200 is a laptop, and the component 220 is a touch pad assembled with the body 210, which is not limited herein. In an embodiment, the electronic device 200 is a portable electronic device, such as a smart phone, a wearable electronic device, a tablet computer, a personal digital assistant (PDA), a desktop computer or a smart television, which is not limited herein.

In detail, in the embodiment, the optical measurement device 100 includes an image capture device 110 and an image processing device 120. The image processing device 120 is coupled to the image capture device 110. In the embodiment, the image capture device 110 is an electron microscope (which is not limited herein) used to capture an image of the electronic device 200, and the image includes the gap 230 between the body 210 and the component 220. The shape of the image capture device 110 is circular, ellipse or polygon, which is not limited here. The image processing device 120 is utilized to receive the image captured by the image capture device 110, and at least an image scanning operation is executed to the image to measure a breadth of the gap 230. In an embodiment, at least one of a boundary detection operation, an image rotation operation and an image adjusting operation is executed to the image, and then the good quality image is obtained. In the embodiment, the image processing device 120 is one or a combination of a central processing unit (CPU), a microprocessor, a digital signal processor (DSP), a programmable controller, an application specific integrated circuit (ASIC), a programmable logic device (PLD), which is not limited herein.

In the embodiment, as to the laptop, the profile of the touch pad (the component 220) is a polygon, more specifically, is a quadrangle. In other embodiments, the profile of the touch pad is other polygons such as pentagon or hexagon, which is not limited here. Consequently, the number of the gap 230 between the component 220 and the body 210 is four, which is determined by the edge number of the quadrangle. In the embodiment, the optical measurement device 100 utilizes the image capture device 110 including a camera to capture the image including one or more gaps of the four the gaps 230 in sequence or at random, and then the breadth of the gap of the captured image is measured. In an embodiment, the profile of the component 220 varies with the shape of the electronic device 200. As a result, the number of the gap 230 between the component 220 and the body 210 changes accordingly. In the embodiment, the number of the camera of the image capture device 110 is less than that of the gap 230, which is not limited herein. In an embodiment, the optical measurement device 100 utilizes a plurality of cameras to capture the images of a plurality of the gaps among the four gaps 230, simultaneously. In other words, the number of the camera is determined by the number of the gap, which is less than or equal to that of the gap.

Figure 3:
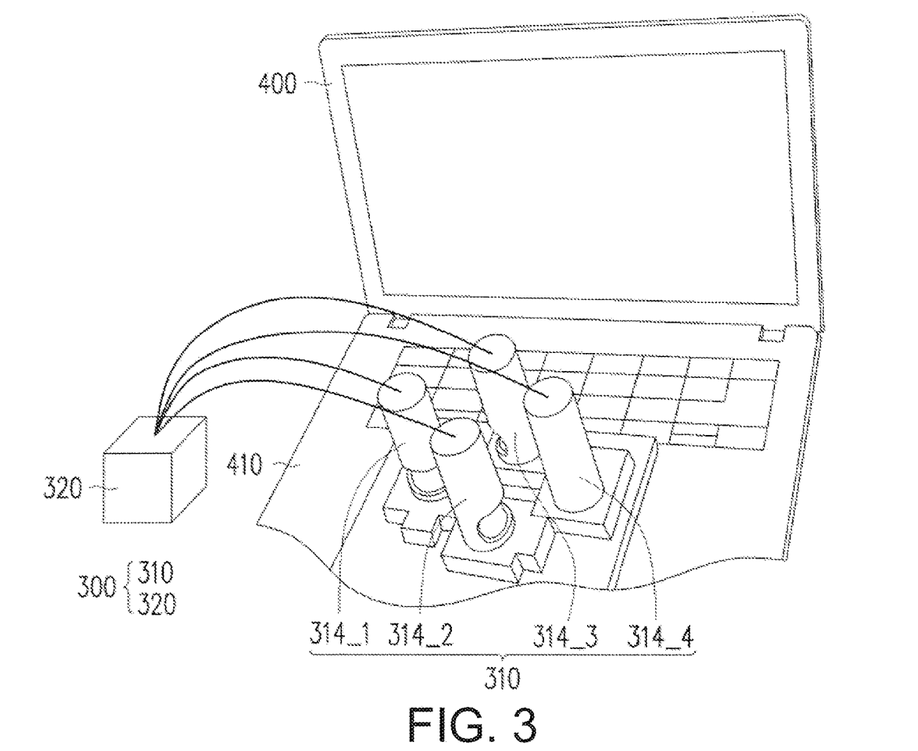
FIG. 3 is a schematic diagram showing an optical measurement device used to measure an electronic device in an embodiment.
Figure 4:
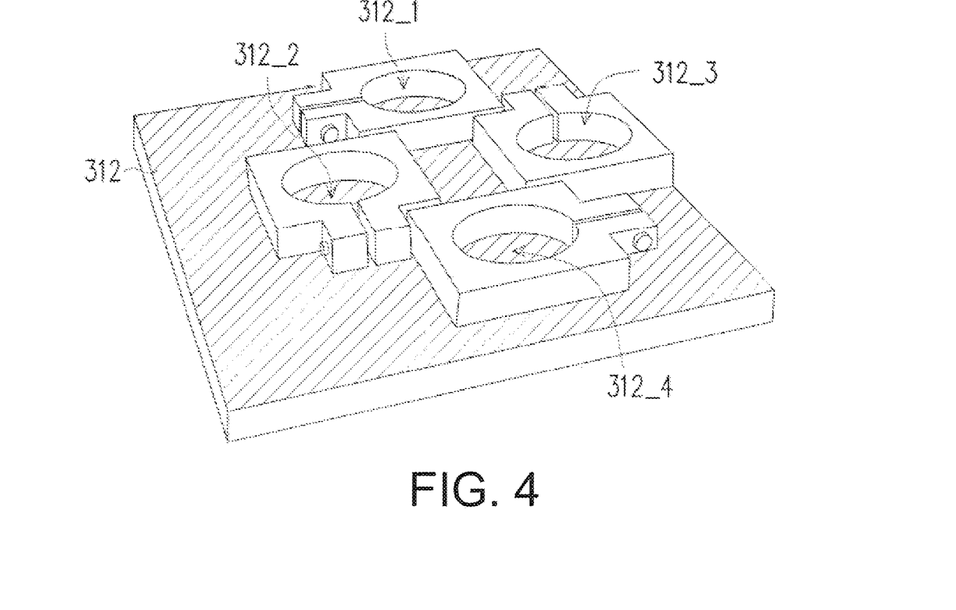
FIG. 4 is a schematic diagram showing a bearing platform in FIG. 3.
Figure 5:
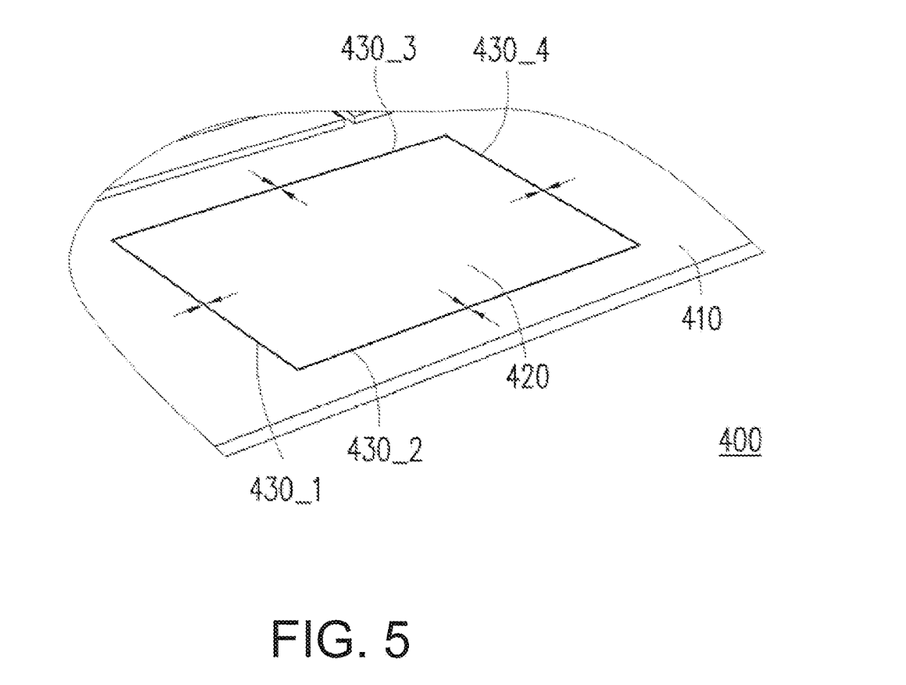
FIG. 5 is a schematic diagram showing a gap in FIG. 3.

In detail, FIG. 3 is a schematic diagram showing an optical measurement device used to measure an electronic device in an embodiment. FIG. 4 is a schematic diagram showing a bearing platform in FIG. 3. FIG. 5 is a schematic diagram showing a gap in FIG. 3. Please refer to FIG. 3 to FIG. 5, the optical measurement device 300 is similar to the optical measurement device 100 in FIG. 1 and FIG. 2, and the difference between them is that the image capture device 310 includes a bearing platform 312 and cameras 314_1 to 314_4.

In detail, in the embodiment, the optical measurement device 300 is used to measure gaps 430_1 to 430_4 between a body 410 and a component 420 of an electronic device 400. In the embodiment, a bearing platform 312 includes a plurality of bearing seats 312_1 to 312_4. The cameras 314_1 to 314_4 are disposed at the bearing seats 312_1 to 312_4 of the bearing platform 312, respectively. The cameras 314_1 to 314_4 are used to capture a plurality of images. Each image includes one corresponding gap among the plurality of gaps. For example, the camera 314_1 is used to capture the image including the gap 430_1, the camera 314_2 is used to capture the image including the gap 430_2, and the camera 314_3 and the camera 314_4 are used to capture the image including the corresponding gaps, and so on. Consequently, the component 420 is a quadrangle according to the profile of the electronic device 400, and thus the number of the gaps 430_1 to 430_4 is four. In an embodiment, the optical measurement device 300 utilizes the four cameras 314_1 to 314_4 to capture the image including the one or more gaps of the gaps 430_1 to 430_4 simultaneously.

In addition, in the embodiment, the method of the optical measurement device 300 measuring the gap can refer to the embodiments in FIG. 1 and FIG. 2, which is omitted herein.

Figure 6:
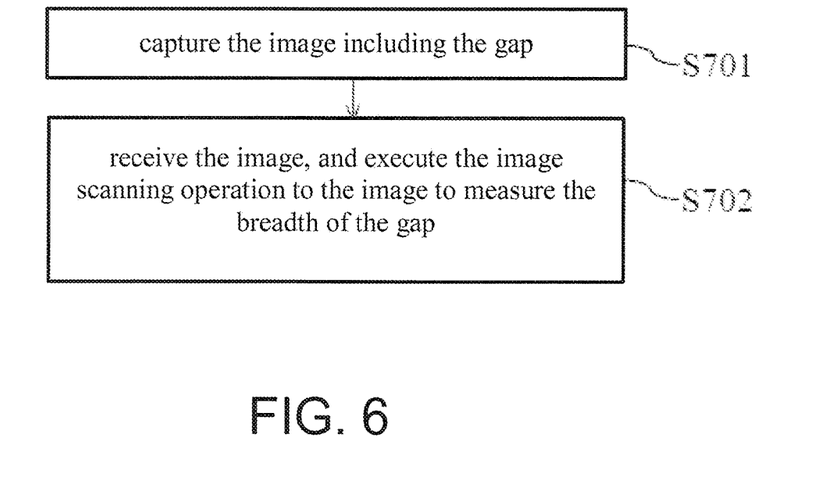
FIG. 6 is a flow chart showing steps of an optical measurement method in an embodiment.
Figure 7:
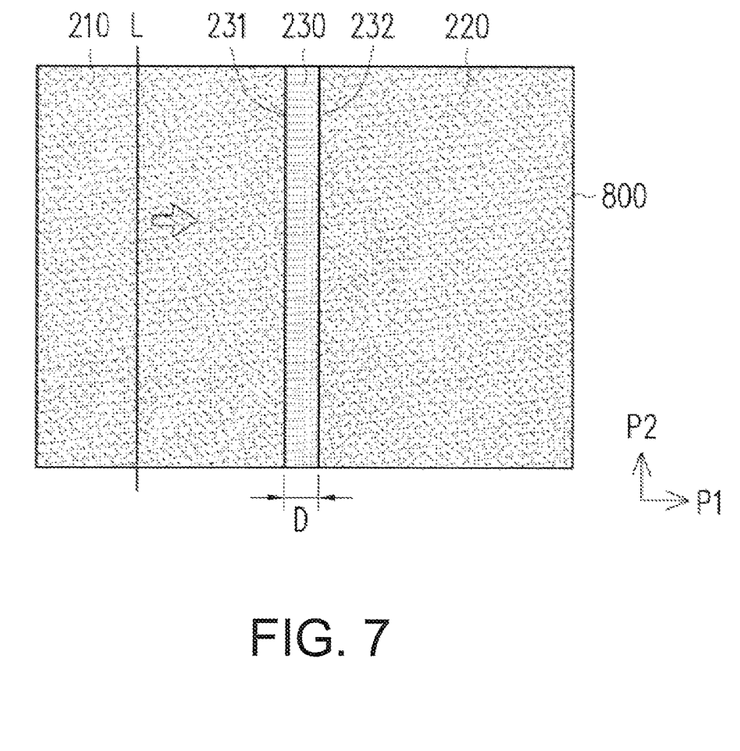
FIG. 7 is a schematic diagram showing an image captured by the optical measurement method in FIG. 6.

FIG. 6 is a flow chart showing steps of an optical measurement method in an embodiment. FIG. 7 is a schematic diagram showing an image obtained by the optical measurement method in FIG. 6. Please refer to FIG. 1, FIG. 2, FIG. 6 and FIG. 7, the optical measurement method in the embodiment applies to the optical measurement device 100 in FIG. 1 and FIG. 2. The optical measurement method in FIG. 1 and FIG. 2 is described in detail hereafter, please also refer to FIG. 1 and FIG. 2.

In step S701, the optical measurement device 100 utilizes the image capture device 110 to capture an image 800 including the gap 230. In step S702, the optical measurement device 100 utilizes the image processing device 120 to receive the image 800, and the image scanning operation is executed to the image 800 to measure a breadth D of the gap 230.

For example, in step S702, in an embodiment, the image processing device 120 scans the image 800 along a first direction P1 based on a scanning reference line L, and then the breadth D of the gap 230 is measured. In the embodiment, the image scanning operation is that a single scan or multiple scans is executed in all or parts of specific or non-specific region of the image 800 along the first direction P1 from left to right or from right to left. In the embodiment, the gap 230 is extending along a second direction P2. The extending direction (the second direction P2) is perpendicular to the scanning direction (the first direction P1). In an embodiment, the first direction P1 is not perpendicular to the second direction P2. In the embodiment that the first direction P1 is not perpendicular to the second direction P2, before the step that the image processing device 120 executes the image scanning operation on the image 800, the image rotation operation is executed to rotate the image 800, and the adjusted second direction P2 is perpendicular to the first direction P1. Then, the image processing device 120 executes the image scanning operation on the image 800 to measure the breadth D of the gap 230.

Additionally, in the embodiment, before the step that the image processing device 120 executes the image scanning operation on the image 800, the boundary detection operation is executed to the image 800 to detect a plurality of boundaries in the image 800. Then, the image processing device 120 executes the image scanning operation on the image 800 to measure the breadth D of the gap 230 according to the boundary detecting result, for example, according to the extending direction of the plurality of boundaries. In the embodiment, the plurality of boundaries includes a first boundary 231 and a second boundary 232 located on two sides of the gap 230. One method of the image processing device 120 calculating the breadth D of the gap 230 is that the breadth is determined by a distance between the first boundary 231 and the second boundary 232 located on two sides of the gap 230.

Consequently, in the embodiment, the optical measurement device 100 utilizes the image capture device 110 to capture the image 800, and thus a non-contact optical measurement method is used to measure the breadth D of the gap 230. As a result, a precise measurement result is quickly provided and the measurement cost is reduced.

In addition, the operation that the optical measurement device 300 in FIG. 3 utilizes the optical measurement method to measure the breadth of the gap can refer to that of the embodiment in FIG. 6 and FIG. 7, which is omitted herein.

Figure 8:
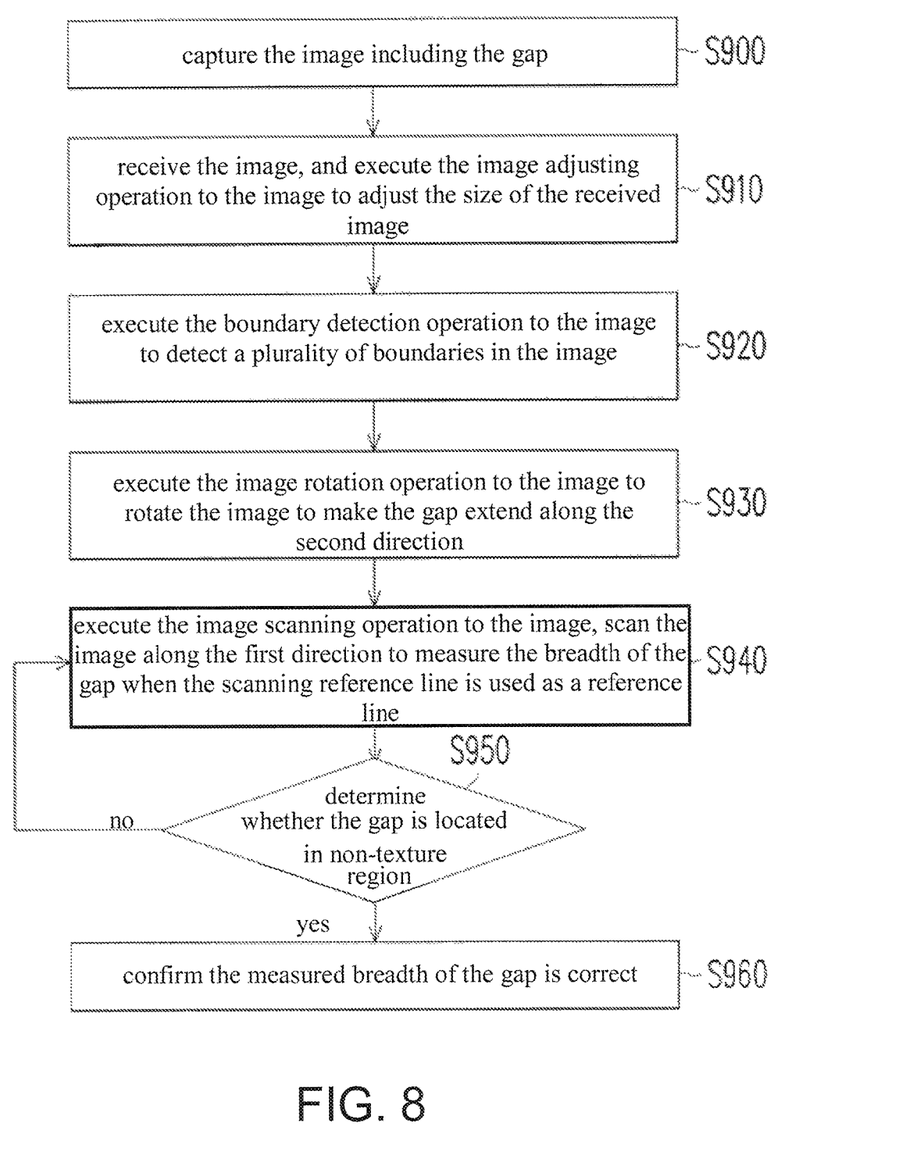
FIG. 8 is a flow chart showing steps of an optical measurement method in an embodiment.
Figure 9:
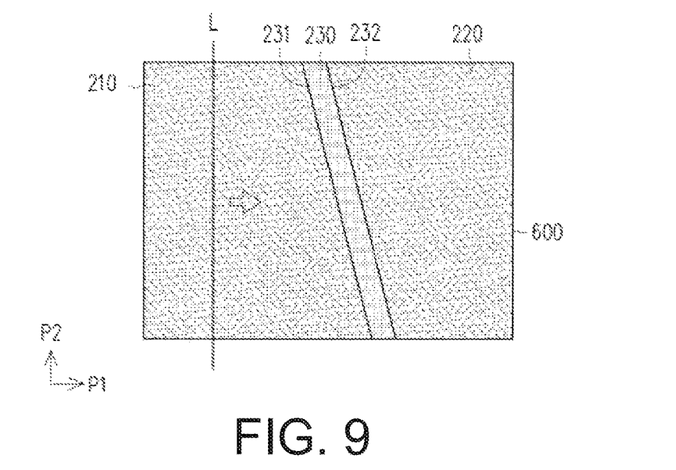
FIG. 9 and FIG. 10 are schematic diagrams showing an image captured by the optical measurement method in FIG. 8, respectively.
Figure 10:
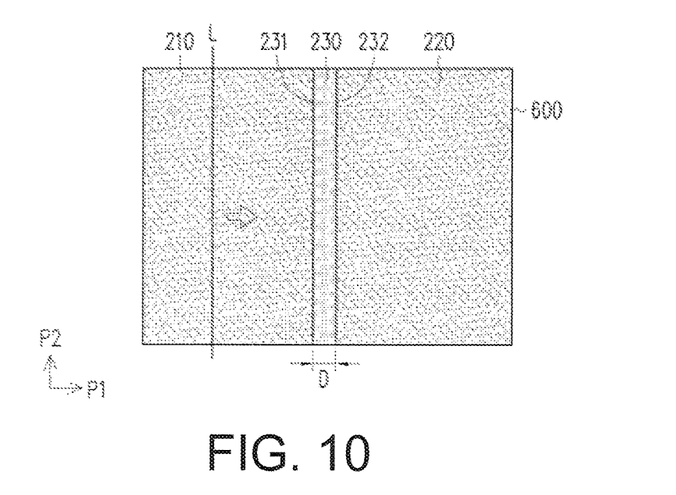

FIG. 8 is a flow chart showing steps of an optical measurement method in an embodiment. FIG. 9 and FIG. 10 are schematic diagrams showing an image obtained by the optical measurement method in FIG. 8, respectively. Please refer to FIG. 1, FIG. 2, FIG. 8 to FIG. 10, and the optical measurement method in the embodiment applies to the optical measurement device 100 in FIG. 1 and FIG. 2. The optical measurement method in FIG. 1 and FIG. 2 is described in detail hereafter, please also refer to FIG. 1 and FIG. 2.

In step S900, the optical measurement device 100 utilizes the image capture device 110 to capture an image 600 including the gap 230. In the embodiment, the extending direction of the gap 230 is different from the scanning direction (the first direction P1) of the image processing device 120, as shown in FIG. 9.

In step S910, the optical measurement device 100 utilizes the image processing device 120 to receive the image 600, and the image adjusting operation is executed to the image 600 to adjust a size of the received image 600. In the embodiment, the image processing device 120 adjusts the size of the image 600 from length-width 1024×768 to length-width 800×600, and then the complexity in other steps of processing the image is reduced. In the embodiment, the image processing device 120 executes the image adjusting operation on the image 600, which does not affect the actual measured breadth D of the gap.

In step S920, the optical measurement device 100 utilizes the image processing device 120 to execute the boundary detection operation on the image 800 to detect a plurality of boundaries in the image 800. In the embodiment, the boundaries include a first boundary 631 and a second boundary 632 located on two sides of the gap 630. In details, in step S900, the extending direction of the gap 230 in the image 600 captured by the image capture device 110 is different from the scanning direction of the image processing device 120. Therefore, in step S920, the image processing device 120 executes the boundary detection operation on the image 600, and then an approximate location and the extending direction of the gap 230 in the image 600 are obtained according to the detection result. In the embodiment, the boundary detection operation includes an image processing step, such as a multistage edge detection algorithm, a generalized Hough transform and a boundary filtering operation, which is not limited herein.

In step S930, the optical measurement device 100 utilizes the image processing device 120 to execute the image rotation operation on the image 600 to rotate the image 600, and then the adjusted gap 230 is extending along the second direction P2 is perpendicular to the first direction P1, as shown in FIG. 10.

In step S940, the optical measurement device 100 utilizes the image processing device 120 to execute the image scanning operation on the image 600, and the image 600 is scanned along the first direction P1 to measure the breadth D of the gap 230 based on the scanning reference line L. In the embodiment, a way of calculating the breadth D of the gap 230 is determined by a distance between the first boundary 231 and the second boundary 232 located on the two sides of the gap 230.

In step S950, the optical measurement device 100 utilizes the image processing device 120 to determine whether the gap 230 is located in the non-texture region. Whether each region of the image 600 is in the texture region or the non-texture region is determined according to a grayscale value of the image 600. For example, if the grayscale value of one region of the image 600 distributes in a large range, that means, the region is the texture region. Conversely, if the grayscale value of another region of the image 600 distributes in a small range, that means, the other region is the non-texture region. Generally, the grayscale value of the gap 230 in the image 600 distributes in a small numerical range. Therefore, the image processing device 120 determines whether the gap 230 measured by the optical measurement device 100 is correct accordingly.

In step S950, when the gap 230 is determined in the non-texture region, the image processing device 120 executes step S960 to confirm the measured breadth D of the gap 230 is correct. In step S950, when the gap 230 is determined in the texture region is determined, the image processing device 120 executes step S940 again to execute the image scanning operation on the image 600, and the breadth D of the gap 230 is measured once again.

In the embodiment, the image adjusting operation in step S910, the boundary detection operation in step S920, the image rotation operation in step S930 and the gap determining operation in step S950 are selectively executed according to the practical requirements, which is not limited herein.

Furthermore, the operation that the optical measurement device 300 in FIG. 3 utilizes the optical measurement method to measure the breadth of the gap can refer to that of the embodiment in FIG. 8 to FIG. 10, which is omitted herein.

In the embodiments, the image processing operation of the image uses the programming languages (such as C or C++), hardware description languages (such as Verilog HDL or VHDL) or other languages to implement as software, hardware or firmware. Moreover, in the embodiments, the image processing device includes computer-accessible medias, such as magnetic tapes, semiconductors memories, magnetic disks, compact disks (CD-ROM or DVD-ROM), or software (or firmware) which can be transmitted via Internet, wired communication, wireless communication or other communication media. The software (or firmware) is stored in the computer accessible media, and the computer processors accesses or performs programming codes of the software (or firmware). Moreover, in the embodiments, the device and the method can be achieved through a combination of hardware and software.

In conclusion, the optical measurement device utilizes the image capture device to capture the image including the gap between the body and the component of the electronic device. Then, the optical measurement device utilizes the image processing device to execute one or more image processing operations on the image, the breadth of the gap of the electronic device is measured to provide a precise measurement result.

Although the invention has been disclosed with reference to certain preferred embodiments thereof, the disclosure is not for limiting the scope. Persons having ordinary skill in the art may make various modifications and changes without departing from the spirit and the scope of the invention. Therefore, the scope of the appended claims should not be limited to the description of the preferred embodiments described above.

What is claimed is:

1. An optical measurement device, measuring a gap on an electronic device, wherein the electronic device includes a body and a component assembled on the body, the gap exists between the body and the component, the optical measurement device comprising:
    an image capture device, capturing an image including the gap; and
    an image processor, coupled to the image capture device, wherein the image processor receives the image and executes an image scanning operation on the image to measure a breadth of the gap,
    wherein the image scanning operation is to scan the image along a first direction to measure the breadth of the gap based on a scanning reference line, the gap is extending along a second direction, and the first direction is different from the second direction,
    wherein the image includes a texture region and a non-texture region, after the image scanning operation is executed on the image, the image processor determines whether the gap is located in the non-texture region, when the gap is determined in the non-texture region, the image processor confirms the breadth of the measured gap, when the gap is determined in the texture region, the image processor executes the image scanning operation on the image again to measure the breadth of the gap again.

2. The optical measurement device according to claim 1, wherein the gap includes a first boundary and a second boundary along the second direction, and the breadth of the gap is determined by a distance between the first boundary and the second boundary.

3. The optical measurement device according to claim 1, wherein before the image scanning operation is executed on the image, the image processor executes a boundary detection operation to the image to measure a first boundary and a second boundary of the gap.

4. The optical measurement device according to claim 1, wherein before the image scanning operation is executed on the image, the image processor executes an image rotation operation on the image to rotate the image for making the gap extend along the second direction.

5. The optical measurement device according to claim 1, wherein before the image scanning operation is executed on the image, the image processor executes an image adjusting operation to the image to adjust a size of the received image.

6. The optical measurement device according to claim 1, wherein the image processor determines the region of the image is in the texture region or in the non-texture region according to a grayscale value of the image.

7. The optical measurement device according to claim 1, wherein the number of the gap is plural, the number of the image is plural, and the image capture device includes:
a bearing platform, including a plurality of bearing seats;
a plurality of cameras, each of the camera disposed at each of the bearing seats of the bearing platform to capture the images, and each of the captured images includes one of the gaps correspondingly.

8. The optical measurement device according to claim 7, wherein a profile of the component of the device is a polygon, the number of the gap is based on an edge number of the polygon, and the number of the cameras is determined by the number of the gaps.

9. An optical measurement method for measuring a gap on an electronic device, wherein the electronic device includes a body and a component assembled on the body, the gap exists between the body and the component, and the optical measurement method includes:

capturing an image including the gap on the electronic device; and
receiving the image and executing an image scanning operation on the image to measure a breadth of the gap,
wherein the image scanning operation is to scan the image along a first direction to measure the breadth of the gap based on a scanning reference line, the gap is extending along a second direction, and the first direction is different from the second direction,
determining whether the gap is located in a non-texture region;
confirming the breadth of the measured gap when the gap is determined in the non-texture region; and
executing the image scanning operation on the image again to measure the breadth of the gap again when the gap is determined in a texture region.

10. The optical measurement device according to claim 9, wherein the gap includes a first boundary and a second boundary along the second direction, and the breadth of the gap is determined by a distance between the first boundary and the second boundary.

11. The optical measurement device according to claim 9, wherein the optical measurement method further includes:
executing a boundary detection operation on the image to detect a first boundary and a second boundary of the gap before executing the image scanning operation on the image.

12. The optical measurement device according to claim 9, wherein before the step of executing the image scanning operation on the image, the optical measurement method further includes:
executing an image rotation operation on the image to rotate the image, for making the gap extend along the second direction.

13. The optical measurement device according to claim 9, wherein before the step of executing the image scanning operation on the image, the optical measurement method further includes:
executing an image adjusting operation on the image to adjust a size of the received image.

14. The optical measurement method according to claim 9, wherein in the step of determining whether the gap is located in the texture region, the region of the image is located in the texture region or the non-texture region is determined according to a grayscale value of the image.

* * * * *